United States Patent
Darrington et al.

(10) Patent No.: US 7,765,385 B2
(45) Date of Patent: Jul. 27, 2010

(54) FAULT RECOVERY ON A PARALLEL COMPUTER SYSTEM WITH A TORUS NETWORK

(75) Inventors: David L. Darrington, Rochester, MN (US); Patrick Joseph McCarthy, Rochester, MN (US); Amanda Peters, Rochester, MN (US); Albert Sidelnik, St. Paul, MN (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 11/736,923

(22) Filed: Apr. 18, 2007

(65) Prior Publication Data

US 2008/0263387 A1    Oct. 23, 2008

(51) Int. Cl.
*G06F 9/00* (2006.01)

(52) U.S. Cl. .......................................... 712/220; 714/4

(58) Field of Classification Search ................ 712/220; 714/4

See application file for complete search history.

(56) References Cited

U.S. PATENT DOCUMENTS

| | | | | | |
|---|---|---|---|---|---|
| 4,769,807 | A | * | 9/1988 | Niwa et al. | 370/224 |
| 5,136,589 | A | * | 8/1992 | Konishi | 714/4 |
| 5,150,356 | A | * | 9/1992 | Tsutsui | 370/223 |
| 5,175,733 | A | * | 12/1992 | Nugent | 370/400 |
| 5,307,353 | A | * | 4/1994 | Yamashita et al. | 714/4 |
| 5,442,620 | A | * | 8/1995 | Kremer | 370/224 |
| 5,689,646 | A | * | 11/1997 | Thorson | 709/239 |
| 5,701,416 | A | * | 12/1997 | Thorson et al. | 712/11 |
| 5,793,746 | A | * | 8/1998 | Gerstel et al. | 370/228 |
| 6,055,618 | A | * | 4/2000 | Thorson | 712/11 |
| 6,230,252 | B1 | * | 5/2001 | Passint et al. | 712/12 |
| 6,278,689 | B1 | * | 8/2001 | Afferton et al. | 370/223 |
| 6,782,198 | B1 | * | 8/2004 | Liu | 398/3 |
| 6,820,210 | B1 | * | 11/2004 | Daruwalla et al. | 714/4 |
| 6,853,635 | B1 | * | 2/2005 | Beshai | 370/351 |
| 6,912,196 | B1 | | 6/2005 | Mahalingaiah | |
| 7,050,398 | B1 | * | 5/2006 | Lee | 370/238 |
| 7,280,470 | B2 | * | 10/2007 | Shiragaki et al. | 370/223 |
| 2002/0059442 | A1 | * | 5/2002 | Van Loo | 709/232 |
| 2003/0189926 | A1 | * | 10/2003 | Watanabe et al. | 370/389 |
| 2005/0175277 | A1 | * | 8/2005 | Tochio et al. | 385/24 |
| 2006/0215544 | A1 | * | 9/2006 | Asa et al. | 370/216 |
| 2007/0086332 | A1 | * | 4/2007 | Way et al. | 370/223 |
| 2007/0242604 | A1 | * | 10/2007 | Takase et al. | 370/223 |

(Continued)

OTHER PUBLICATIONS

Culler, David E, "Parallel computer architecture: a hardware/software approach—passage: pp. 768-772", 1999, Morgan Kaufmann, San Francisco, CA, USA, XP002493326.

(Continued)

*Primary Examiner*—Eddie P Chan
*Assistant Examiner*—Idriss N Alrobaye
(74) *Attorney, Agent, or Firm*—Martin & Associates, LLC; Bret J. Petersen (57) ABSTRACT

An apparatus and method for overcoming a torus network failure in a parallel computer system. A mesh routing mechanism in the service node of the computer system configures the nodes from a torus to a mesh network when a failure occurs in the torus network. The mesh routing mechanism takes advantage of cutoff registers in each node to route node to node data transfers around the faulty node or network connection.

14 Claims, 6 Drawing Sheets

U.S. PATENT DOCUMENTS

2008/0101232 A1* 5/2008 Archer et al. ............... 370/235
2008/0273875 A1* 11/2008 Sone et al. .................. 398/58

OTHER PUBLICATIONS

Grammatikakis, Miltos D., "Parallel system interconnections and communications—passage: pp. 50-53", 2001, CRC Press, Boca Raton, FL, USA, XP002493327.

Archer et al, U.S. Appl. No. 11/539,248, filed Oct. 6, 2006, "Method and Apparatus for Routing Data in an Inter-Nodal Communications Lattice of a Massively Parallel Computer System by Dynamic Global Mapping of Contended Links".

Archer et al, U.S. Appl. No. 11/539,270, filed Oct. 6, 2006, "Method and Apparatus for Routing Data in an Inter-Nodal Communications Lattice of a Massively Parallel Computer System by Semi-Randomly Varying Routing Policies for Different Packets".

Archer et al, U.S. Appl. No. 11/539,300, filed Oct. 6, 2006, "Method and Apparatus for Routing Data in an Inter-Nodal Communications Lattice of a Massively Parallel Computer System by Routing Through Transporter Nodes".

Archer et al, U.S. Appl. No. 11/539,329, filed Oct. 6, 2006, "Method and Apparatus for Routing Data in an Inter-Nodal Communication Lattice of a Massively Parallel Computer System by Dynamically Adjusting Local Routing Strategies".

Darrington et al, U.S. Appl. No. 11/670,803, filed Feb. 2, 2007, "Fault Recovery on a Massively Parallel Computer System to Handle Node Failures Without Ending an Executing Job".

* cited by examiner

FAULT RECOVERY ON A PARALLEL COMPUTER SYSTEM WITH A TORUS NETWORK

BACKGROUND OF THE INVENTION

1. Technical Field

This invention generally relates to fault recovery in a parallel computing system, and more specifically relates to an apparatus for fault recovery from a failed portion of a torus network in a massively parallel super computer.

2. Background Art

Efficient fault recovery is important to decrease down time and repair costs for sophisticated computer systems. On parallel computer systems with a large number of compute nodes, a failure of a single component may cause a large portion of the computer to be taken off line for repair.

Massively parallel computer systems are one type of parallel computer system that have a large number of interconnected compute nodes. A family of such massively parallel computers is being developed by International Business Machines Corporation (IBM) under the name Blue Gene. The Blue Gene/L system is a scalable system in which the current maximum number of compute nodes is 65,536. The Blue Gene/L node consists of a single ASIC (application specific integrated circuit) with 2 CPUs and memory. The full computer is housed in 64 racks or cabinets with 32 node boards in each rack.

The Blue Gene/L supercomputer communicates over several communication networks. The 65,536 computational nodes are arranged into both a logical tree network and a 3-dimensional torus network. The logical tree network connects the computational nodes in a tree structure so that each node communicates with a parent and one or two children. The torus network logically connects the compute nodes in a three-dimensional lattice like structure that allows each compute node to communicate with its closest 6 neighbors in a section of the computer. Since the compute nodes are arranged in a torus and tree network that require communication with adjacent nodes, a hardware failure of a single node can bring a large portion of the system to a standstill until the faulty hardware can be repaired. For example, a single node failure or network connection could render inoperable a dimension of the torus network in a partition of the computer system. Further, all the hardware assigned to the partition of the failure may also need to be taken off line until the failure is corrected.

On prior art systems with a torus network, a failure of a single node or network connection often requires the computer be taken off line for repair. When a failure of the torus network occurs, it is advantageous to be able to overcome the failure as quickly and efficiently as possible. Without a way to more effectively overcome a torus network failure, parallel computer systems will continue to waste potential computer processing time and increase operating and maintenance costs.

DISCLOSURE OF INVENTION

According to the preferred embodiments, an apparatus and method is described for overcoming a torus network failure in a parallel computer system. A mesh routing mechanism in the service node of the computer system configures the nodes from a torus network to a mesh network when a failure occurs in the torus network. The mesh routing mechanism takes advantage of cutoff registers in each node to route node to node data transfers over the network without traversing the faulty node or network connection.

The examples and disclosure are directed to the Blue Gene architecture but extend to any parallel computer system with multiple processors arranged in a network structure where the node hardware handles cut through traffic from other nodes.

The foregoing and other features and advantages will be apparent from the following more particular description, as illustrated in the accompanying drawings.

BRIEF DESCRIPTION OF DRAWINGS

The disclosure will be described in conjunction with the appended drawings, where like designations denote like elements, and.

BEST MODE FOR CARRYING OUT THE INVENTION

The disclosure and claims herein are directed to an apparatus and method for overcoming a torus network failure in a parallel computer system. A mesh routing mechanism in the service node of the computer system configures the nodes from a torus network to a mesh network using cutoff registers in each node to route node to node data transfers around the faulty node or network connection. The preferred embodiments will be described with respect to the Blue Gene/L massively parallel computer being developed by International Business Machines Corporation (IBM).

Figures 1, 2:
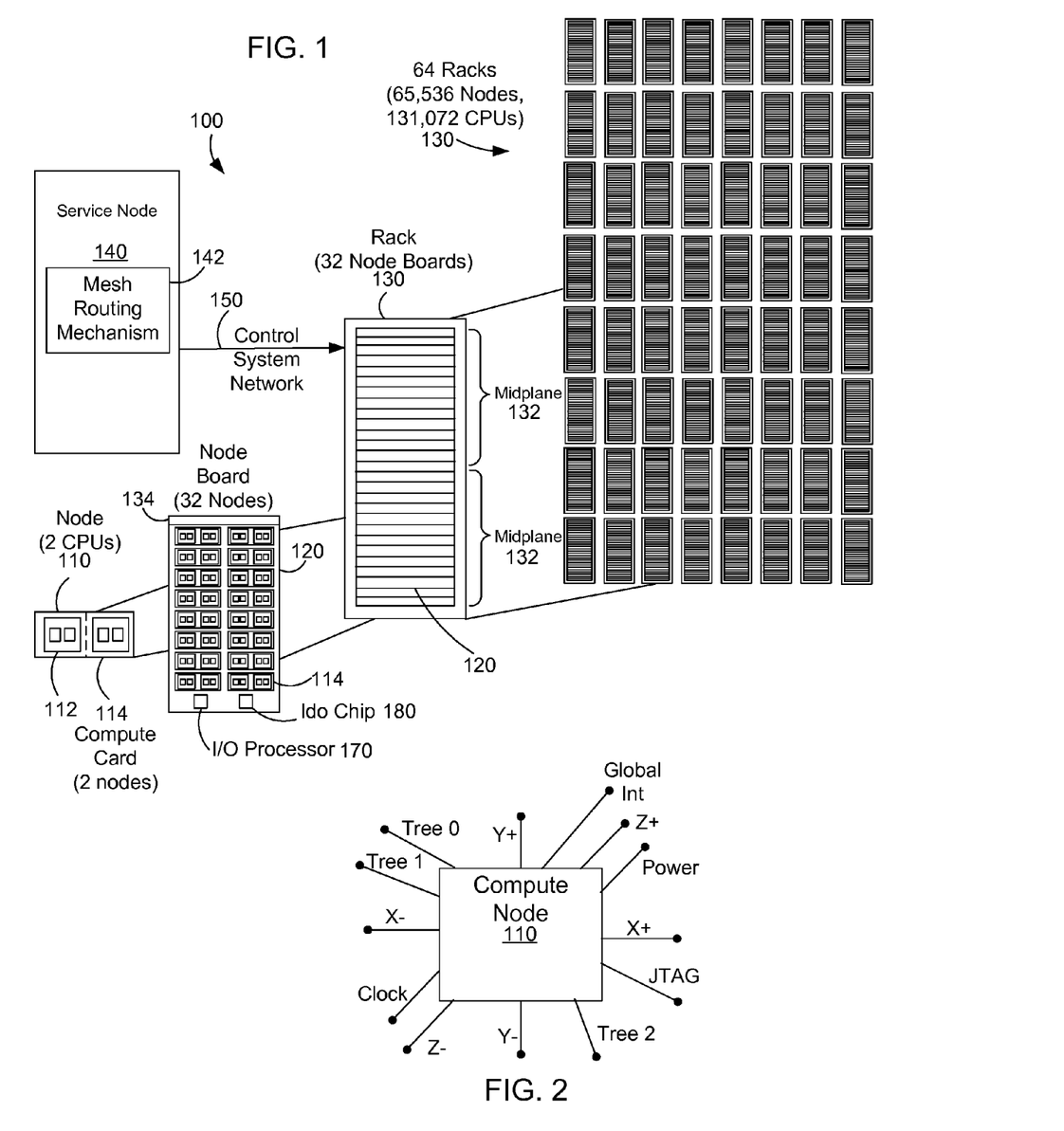
FIG. 1 is a block diagram of a massively parallel computer system according to preferred embodiments.
FIG. 2 is a block diagram that shows the input and output connections of a compute node in a massively parallel computer system.

FIG. 1 shows a block diagram that represents a massively parallel computer system 100 such as the Blue Gene/L computer system. The Blue Gene/L system is a scalable system in which the maximum number of compute nodes is 65,536. Each node 110 has an application specific integrated circuit (ASIC) 112, also called a Blue Gene/L compute chip 112 which incorporates two processors or central processor units (CPUs). The node also typically has 512 megabytes of local memory (not shown). The compute chip and memory for two nodes are mounted on a node compute card 114. A node board 120 accommodates 16 node compute cards 114 each having two nodes 110. Thus, each node board has 32 nodes, with 2 processors for each node, and the associated memory for each processor. A rack 130 is a housing that contains 32 node boards 120 connected into two midplanes 132. Each of the node boards 120 connect into a midplane printed circuit board 132 with a midplane connector 134. The midplane 132 is inside the rack and not shown in FIG. 1. The full Blue Gene/L computer system would be housed in 64 racks 130 or cabinets with 32 node boards 120 in each. The full system would then have 65,536 nodes and 131,072 CPUs (64 racks×32 node boards×32 nodes×2 CPUs).

The Blue Gene/L computer system structure can be described as a compute node core with an I/O node surface, where communication to 1024 compute nodes 110 is handled by each I/O node that has an I/O processor 170 connected to the service node 140. The I/O nodes have no local storage. The I/O nodes are connected to the compute nodes through the logical tree network and also have functional wide area network capabilities through a functional network (not shown). The functional network is connected to an I/O processor (or Blue Gene/L link chip) 170 located on a node board 120 that handles communication from the service node 140 to a number of nodes. The Blue Gene/L system has one or more I/O processors 170 on an I/O board (not shown) connected to the node board 120. The I/O processors can be configured to communicate with 8, 32 or 64 nodes. The connections to the I/O nodes are similar to the connections to the compute node except the I/O nodes are not connected to the torus network.

Again referring to FIG. 1, the computer system 100 includes a service node 140 that handles the loading of the nodes with software and controls the operation of the whole system. The service node 140 is typically a mini computer system such as an IBM pSeries server running Linux with a control console (not shown). The service node 140 is connected to the racks 130 of compute nodes 110 with a control system network 150. The control system network provides control, test, and bring-up infrastructure for the Blue Gene/L system. The control system network 150 includes various network interfaces that provide the necessary communication for the massively parallel computer system. The network interfaces are described further below.

The service node 140 manages the control system network 150 dedicated to system management. The control system network 150 includes a private 100-Mb/s Ethernet connected to an Ido chip 180 located on a node board 120 that handles communication from the service node 140 to a number of nodes. This network is sometime referred to as the JTAG network since it communicates using the JTAG protocol. All control, test, and bring-up of the compute nodes 110 on the node board 120 is governed through the JTAG port communicating with the service node. In addition, the service node 140 includes a mesh routing mechanism 142 that configures the torus network into a mesh network when there is a fault in the torus network. The mesh routing mechanism assigns values to cutoff registers in the nodes to route node traffic around the fault in the torus network. The mesh routing mechanism 142 comprises software in the service node 140 but may be assisted by operating system software executing on the nodes of the system.

The Blue Gene/L supercomputer communicates over several communication networks. FIG. 2 shows a block diagram that shows the I/O connections of a compute node on the Blue Gene/L computer system. The 65,536 computational nodes and 1024 I/O processors 170 are arranged into both a logical tree network and a logical 3-dimensional torus network. The torus network logically connects the compute nodes in a lattice like structure that allows each compute node 110 to communicate with its closest 6 neighbors. In FIG. 2, the torus network is illustrated by the X+, X−, Y+, Y−, Z+ and Z− network connections that connect the node to six respective adjacent nodes. The tree network is represented in FIG. 2 by the tree0, tree1 and tree2 connections. Other communication networks connected to the node include a JTAG network and a the global interrupt network. The JTAG network provides communication for testing and control from the service node 140 over the control system network 150 shown in FIG. 1. The global interrupt network is used to implement software barriers for synchronization of similar processes on the compute nodes to move to a different phase of processing upon completion of some task. The global interrupt network can thus be used to start, stop and pause an application running on a partition of nodes. Further, there are clock and power signals to each compute node 110.

The Blue Gene/L torus network connects each node to its six nearest neighbors (X+, X−, Y+, Y−, Z+, Z−) in a logical 3D Cartesian array. The connections to the six neighbors is done at the node level, and at the midplane level. Each midplane is a 8×8×8 array of nodes. The six faces (X+, X−, Y+, Y−, Z+, Z−) of the node array in the midplane are each 8×8=64 nodes in size. Each torus network signal from the 64 nodes on each of the six faces is communicated through the link cards (not shown) connected to the midplane to the corresponding nodes in adjacent midplanes. The signals of each face may also be routed back to the inputs of the same midplane on the opposite face when the midplane is used in a partition with a depth of one midplane in any dimension.

Figure 3:
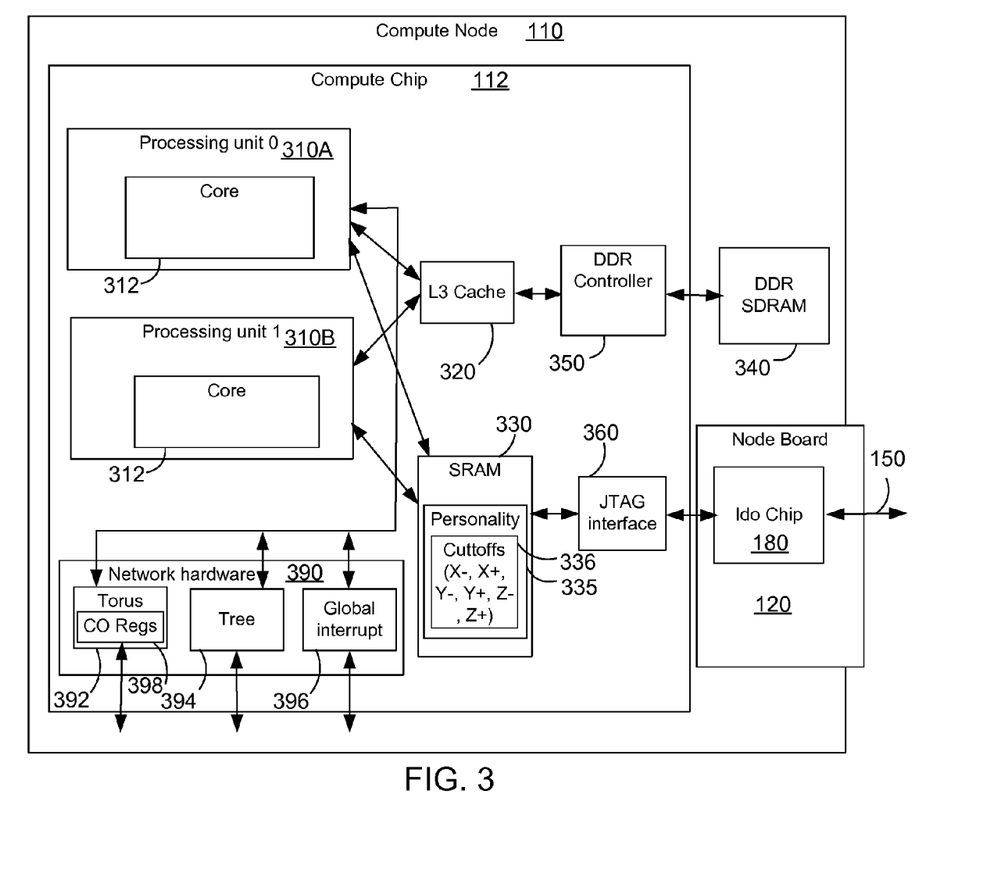
FIG. 3 is a block diagram of a compute node in a massively parallel computer system.

FIG. 3 illustrates a block diagram of a compute node 110 in the Blue Gene/L computer system. The compute node 110 has a node compute chip 112 that has two processing units 310A, 310B. Each processing unit 310, has a processing core 312. The processing units 310 are connected to a level three memory cache (L3 cache) 320, and to a static random access memory (SRAM) memory bank 330. Data from the L3 cache 320 is loaded to a bank of dual data rate (DDR) synchronous dynamic random access memory (SDRAM) 340 by means of a DDR memory controller 350.

Again referring to FIG. 3, the SRAM memory 330 is connected to a JTAG interface 360 that communicates off the compute chip 112 to an Ido chip 180. The service node communicates with the compute node through the Ido chip 180 over the an ethernet link that is part of the control system network 150 (described above with reference to FIG. 1). In the Blue Gene/L system there is one Ido chip per node board 120, and others on boards in each midplane 132 (FIG. 1). The Ido chips receive commands from the service node using raw UDP packets over a trusted private 100 Mbit/s Ethernet control network. The Ido chips support a variety of serial protocols for communication with the compute nodes. The JTAG protocol is used for reading and writing from the service node 140 (FIG. 1) to any address of the SRAMs 330 in the compute nodes 110 and is used for the system initialization and booting process.

The node compute chip 112, illustrated in FIG. 3, further includes network hardware 390. The network hardware 390 includes hardware for the Torus 392, Tree 394 and Global interrupt 396 networks. These networks of the Blue Gene/L are used for a compute node 110 to communicate with the other nodes in the system as described briefly above. The network hardware 390 allows the compute node to receive and pass along data packets over the torus network. The network hardware 390 handles network data traffic independently so the compute node's processors are not burdened by the amount of data flowing on the torus network.

As illustrated in FIG. 3, the SRAM 330 includes a personality 335. During the boot process, the service node stores information that is specific to an individual node in the personality. The personality includes cutoff data 336 for the X−, X+, Y−, Y+, Z− and Z+ cutoff registers 398 that are part of the torus network hardware 392 (described more below). When the node is initialized, initialization software uses the cutoff data 336 in the personality 335 to configure the cutoff registers 398. The service node can change the X, Y, Z cutoff data 336 and direct the node to update the cutoff registers 398. In the prior art, the cutoff registers were used to change the torus network into a mesh network which is more suitable for some types of computer applications. The prior art feature of the cutoff registers is used by the mesh routing mechanism 142 (FIG. 1) in a novel way to overcome node failures or network faults as described further below.

Figure 4:
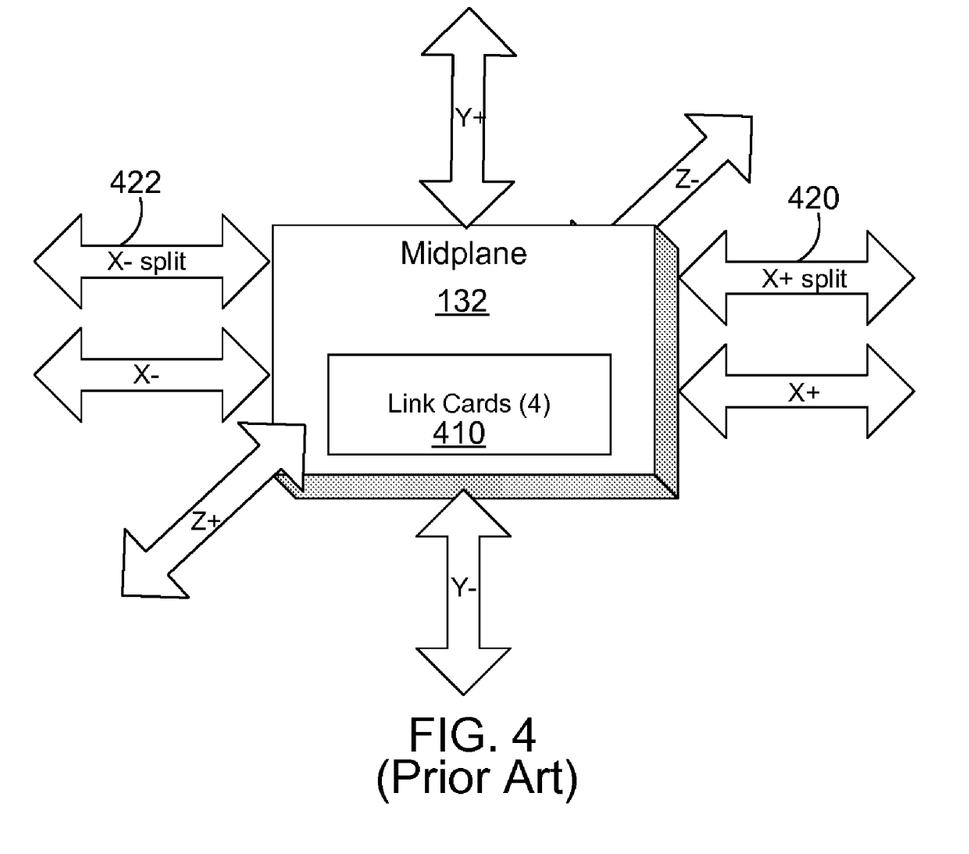
FIG. 4 is a block diagram of a midplane in a massively parallel computer system.

FIG. 4 illustrates a midplane 132 of the BG/L computer system. As stated above, each rack of nodes is divided into two midplanes. Each of the midplanes is connected to its six adjacent neighbors in the torus network as indicated by the arrows from each face of the midplane 132. Besides the 16 node cards, each with 32 BG/L compute nodes, each midplane contains four link cards 410 with six link chips 510 (not shown) on each link card for a total of 24 link chips per midplane. At the midplane boundaries, all the BG/L networks pass through a link chip. The link chip serves two functions. First, it re-drives signals over the cables between the midplanes, restoring the high-speed signal shape and amplitude in the middle of a long lossy trace-cable-trace connection between compute ASICs on different midplanes. Second, the link chip can redirect signals between its different ports. This redirection function allows BG/L to be partitioned into multiple logically separate systems.

Again referring to FIG. 4, each midplane communicates with its 6 neighboring midplanes on the torus network. The connections to the 6 neighboring midplanes are designated by their Cartesian coordinates with respect to the midplane and therefore lie in the X+, X−, Y+, Y−, Z+ and Z− directions as shown. In addition, there is an additional set of connections in the X axis called X split cables (not shown). The X split cables include an X+ split cable and an X− split cable. The X split cables provide a way to enhance partition functionality by providing an additional route for connecting the torus network in the X dimension. In the BG/L system, the link card has a number of link chips (not shown) that support routing of the torus network signals from one midplane to the next. This routing is set by the host at the time the partition is created and is static until another partition is created or reconfigured. Each link chip port supports 21 differential pairs (16 data signals, a sense signal to prevent an unpowered chip from being driven by driver outputs from the other end of the cable, a spare signal, a parity signal, and two asynchronous global interrupt signals).

The BG/L torus interconnect requires a node to be connected to its six nearest neighbors (X+, X−, Y+, Y−, Z+, Z−) in a logical 3D Cartesian array. The connections to the six neighbors is done at the node level, and at the midplane level. Each midplane is a 8×8×8 array of nodes. The six faces (X+, X−, Y+, Y−, Z+, Z−) of the node array in the midplane are each 8×8=64 nodes in size. Each torus network signal from the 64 nodes on each of the six faces is communicated through the link chips to the corresponding nodes in adjacent midplanes. The signals of each face may also be routed back to the inputs of the same midplane on the opposite face when the midplane is used in a partition with a depth of one midplane in any dimension. Each link chip port serves 16 unidirectional torus links entering and exiting the midplane using the data signals of the 21 pairs through each port. Each midplane is served by 24 link chips with two ports of each link chip with 16 data signals on each port. Thus the six faces with 64 nodes requires 384 input and 384 output data signals supplied by 2 ports on the 24 link chips with each port supporting 16 data signals (16×24=384 for input and 384 for output).

Figure 5:
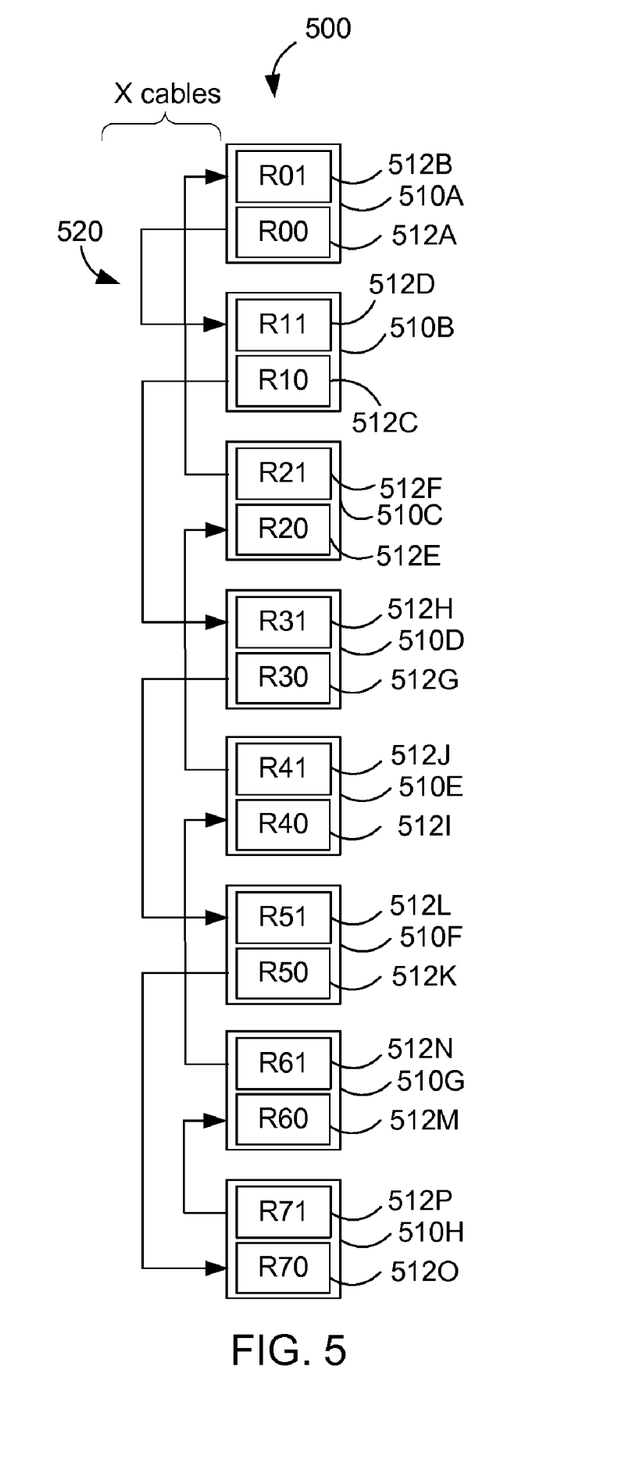
FIG. 5 is a block diagram representing a partition of a highly interconnected computer system such as a massively parallel computer system.

FIG. 5 illustrates a set 500 of racks 510A-510H with midplanes 512A-512P of a massively parallel computer system such as the Blue Gene/L computer system that are arranged into a partition in the X dimension. Each of the racks 510A-510H represent a rack 130 as shown in FIG. 1 and each of the midplanes 512A-512P are a midplane 132 also shown in FIG. 1. Each midplane 512A-510P is arranged to connect the nodes as an 8×8×8 torus, where the coordinates of the torus are X, Y, and Z. Each rack is arranged in a 8×8×16 torus since the two midplanes of each rack are arranged in the Z dimension. The first rack 510A is rack 0 (R0) and has two midplanes R00 512 and R01 514. Similarly, rack R1 has two midplanes R10 521C and R11 512D. The remaining midplanes 512C-512 P are similarly numbered R20 through R71 in rack R2 through rack R7. In the illustrated partition, the X cables 520 connect the 8 racks in the X dimension and the Y and Z dimensions are wrapped around in a single midplane, meaning the nodes on the face of the rack in the Y and Z dimensions are connected back to nodes on the opposite face of the same rack to complete the torus. The X split cables are not shown in this example. Thus the partition shown in FIG. 5 is a 128×8×8 torus. The X dimension cables 520 can be seen to connect the racks in the order of R0, R1, R3, R5, R7, R6, R4, R2 by following the direction of the X cables into a rack and then leaving the rack to the next rack.

Figure 6:
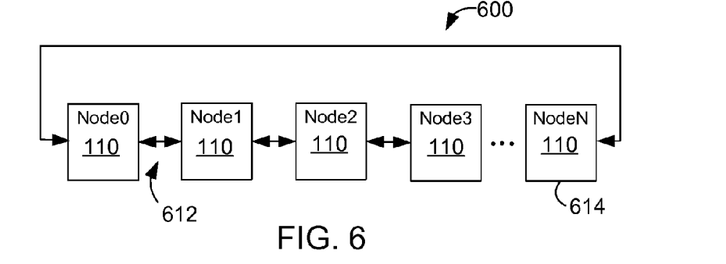
FIG. 6 is a block diagram of a sequence of nodes connected with a torus network.

FIG. 6 illustrates a set 600 of nodes 110 connected by a torus network 612 in a partition of a massively parallel computer system such as the Blue Gene/L computer system. FIG. 6 shows a logical representation of the nodes in the system shown in FIG. 5 connected in a torus. The number of nodes may vary depending on the number of racks included in the partition as illustrated by the variable number N in the last node 614. In the illustrations herein, the X+ dimension is from left to right, and the X− dimension is from right to left. The logical representation shown in FIG. 6 represents the nodes arranged in the X dimension only. The other dimensions of the torus network are arranged in the same manner. The mesh routing mechanism 142 described above can transform the torus network shown in FIG. 6 into a mesh network, which is essentially an open torus, or a network that is linear connection of nodes in one or more dimensions. The mesh routing mechanism 142 can overcome a fault in a node or in a connection between nodes by routing all torus traffic away from the fault.

For each direction in the torus (X+, X−, Y+, Y−, Z+, Z−) there is a special register in each node called the cutoff register 398 as discussed above with reference to FIG. 3. The mesh routing mechanism routes network data traffic without traversing a fault in a node or a network connection using the cutoff registers to tell the nodes how to route the network traffic. The cutoff register is assigned a value as described below to route data on the mesh network without traversing the faulty node or network that caused a failure of the torus network. In the prior art, the torus was programmed as a mesh by setting the cutoff in the X+ dimension to number of nodes in x dimension and the cutoff in the X− dimension to zero. In contrast, the mesh routing mechanism disclosed herein sets the cutoff registers such that any failed node and/or network is eliminated from the torus and the remaining mesh network can still be utilized.

The mesh routing mechanism is given the location of a failed node or network by the fault detection hardware and software of the parallel computer system. The mesh routing mechanism then determines how to assign the cutoff registers to route data over the open torus (mesh network) without traversing the failed nodes and/or failed network connection. An example of how assign the cutoff registers is described below. The values of the cutoff registers are then loaded as cutoff data into the node's personality as described above with reference to FIG. 3. When the node is reset, the node reset software then uses the cutoff data from the node's personality to set the cutoff registers. The mesh network can then be utilized by an application initialized to run on the parallel computer system.

The cutoff registers are each assigned a value by the mesh routing mechanism (142 in FIG. 1) to be used to route data around a failed node. When there is a break in the torus network, the break between the two nodes will be in the X+ link of one node and the X− link of the next node in the network. The mesh routing mechanism may assign each cutoff registers to route around the failed node as follows:

Where break_plus is the node where the X+ link is broken;

where break_minus is the node where the X− link is broken; and the node_coord is the value 0 through N (corresponding to Node0 through NodeN) of the node for the cutoff register being determined;

```
If (node_coord <= break_plus)
    Then assign x− cutoff = 0, and
    x+cutoff = break_plus;
Else
    assign x− cutoff = break_minus, and
    x+cutoff = max node in X dimension
```

With the cutoff registers assigned as described above, data is routed around the failed link in network using the routing method described below.

When a data packet is sent over the torus network, the coordinates of the sending node and the destination node are used in conjunction with the cutoff registers to determine which direction in the X dimension to send the data packet according to the method described below. Similar methods are used for Y and Z dimensions.

In the x dimension:

```
If (sending node > destination node ) // this implies X− direction
and if (destination node > = cutoff for x− direction) send in
    X− direction else send in X+ direction
If (sending node < destination node ) // this implies X+ direction
and if (destination node < = cutoff for x+ direction) send in X+ direction
else send in X− direction
```

Figure 7:
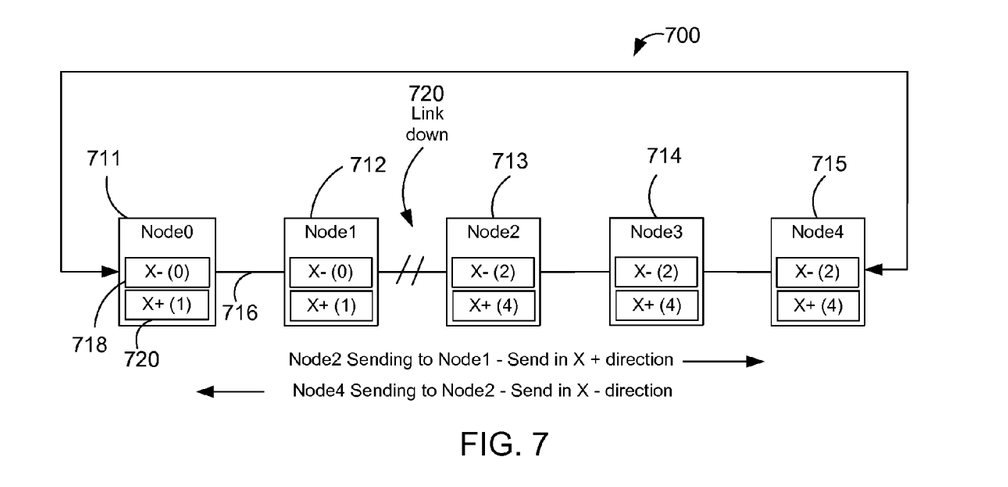
FIG. 7 is a block diagram to illustrate an example of node communication using cutoff registers to route network traffic.

An example of overcoming a fault with the mesh routing mechanism 142 will now be described with reference to FIG. 7. FIG. 7 illustrates a logical representation of a set of nodes 711-715 similar to those shown in FIG. 6. Each node 711-715 is connected to its two neighbors in the X dimension by a torus network 716. Further, each node 711-715 has an X− cutoff register 718 and an X+ cutoff register 720. The contents of each of these registers is shown in parentheses. For the example shown in FIG. 7, we assume there is a break in the torus network such that the link 720 in the network is down between node1 712 and node2 713. The values in the cutoff registers are assigned as described above. For this example, the break_plus is "1" since the break in the network is in the X+ side of Node1. Similarly, the break_minus is "2" since the break in the network is on the X− side of node2. For the nodes less than or equal to break_plus (node0 and node1 are <=1) the x− cutoff is set to "0" and the x+ cutoff is set to "1". Similarly, for the nodes greater than the break_plus, the X− cutoff is set to "2" and the X+ cutoff is set to the maximum node in X (4).

Again referring to FIG. 7, with the cutoff registers now assigned the values as shown in FIG. 7 and described above, we now assume that node2 713 needs to send data to node1 712 and apply this scenario to the above method. Since the sending node is greater than the destination node it implies that we will send in the X− direction unless the exception applies. Since the destination node (1) is not greater than or equal to the X− cutoff (0), the exception applies and we send in the X+ direction. Similarly, we assume node4 715 needs to send data to node2 712 and apply the method. Since the sending node (node5) is greater than the destination node (node2) it implies we will send in the X− direction. Since the destination node (node2) is equal to the cutoff (2) send in the X− direction. Thus the torus has been formed into a mesh with the torus "open" at the connection between node1 712 and node2 713.

Figure 8:
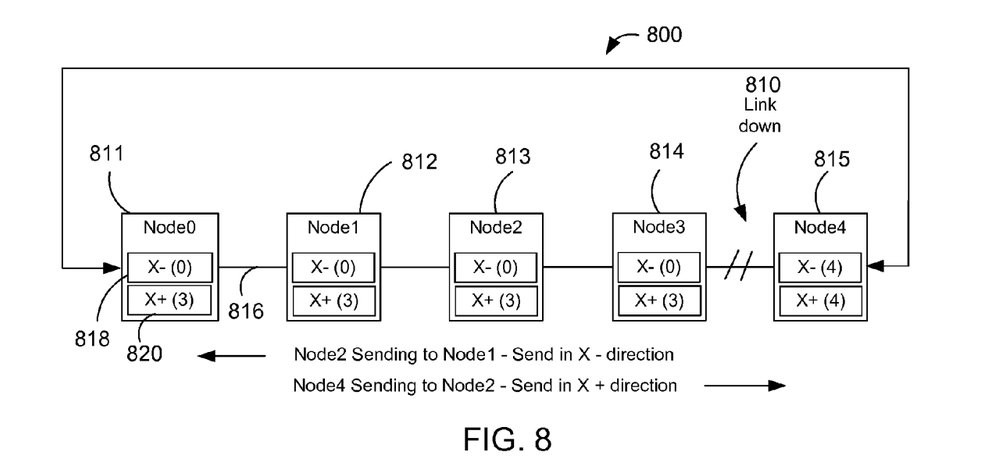
FIG. 8 is another block diagram to show an example of node communication using cutoff registers to route network traffic.

Another example of overcoming a fault will now be described with reference to FIG. 8. FIG. 8 illustrates a logical representation of a set of nodes 811-815 connected by a torus network 816 similar to FIG. 7. Each node 811-815 has an X− cutoff register 818 and an X+ cutoff register 820. The contents of each of these registers is shown in parenthesis. For this example, we assume there is a break 810 in the torus network between node3 814 and node4 815. The values in the cutoff registers are assigned as described above. For this example, the break_plus is "3" since the break in the network is in the X+ side of Node3. Similarly, the break_minus is "4" since the break in the network is on the X− side of node4. For the nodes less than or equal to break_plus (node0 through node3 are <=3) the x− cutoff is set to "0" and the x+ cutoff is set to "3". Similarly, for the node greater than the break_plus (node4), the X− cutoff is set to "4" and the X+ cutoff is set to the maximum node in X (4).

Again referring to FIG. 8, with the cutoff registers now assigned the values as shown in FIG. 8 and described above, we now assume that node2 needs to send data to node1 and apply this scenario to the above method. Since the sending node is greater than the destination node it implies that we will send in the X− direction unless the exception applies. Since the destination node (1) is greater than or equal to the X− cutoff (0), send in the X− direction. Similarly, we assume node4 815 needs to send data to node2 812 and apply the method. Since the sending node (node4) is greater than the destination node (node2) it implies we will send in the X− direction. Since the destination node (node2) is not less than or equal to the cutoff (node4) send in the X+ direction.

Figure 9:
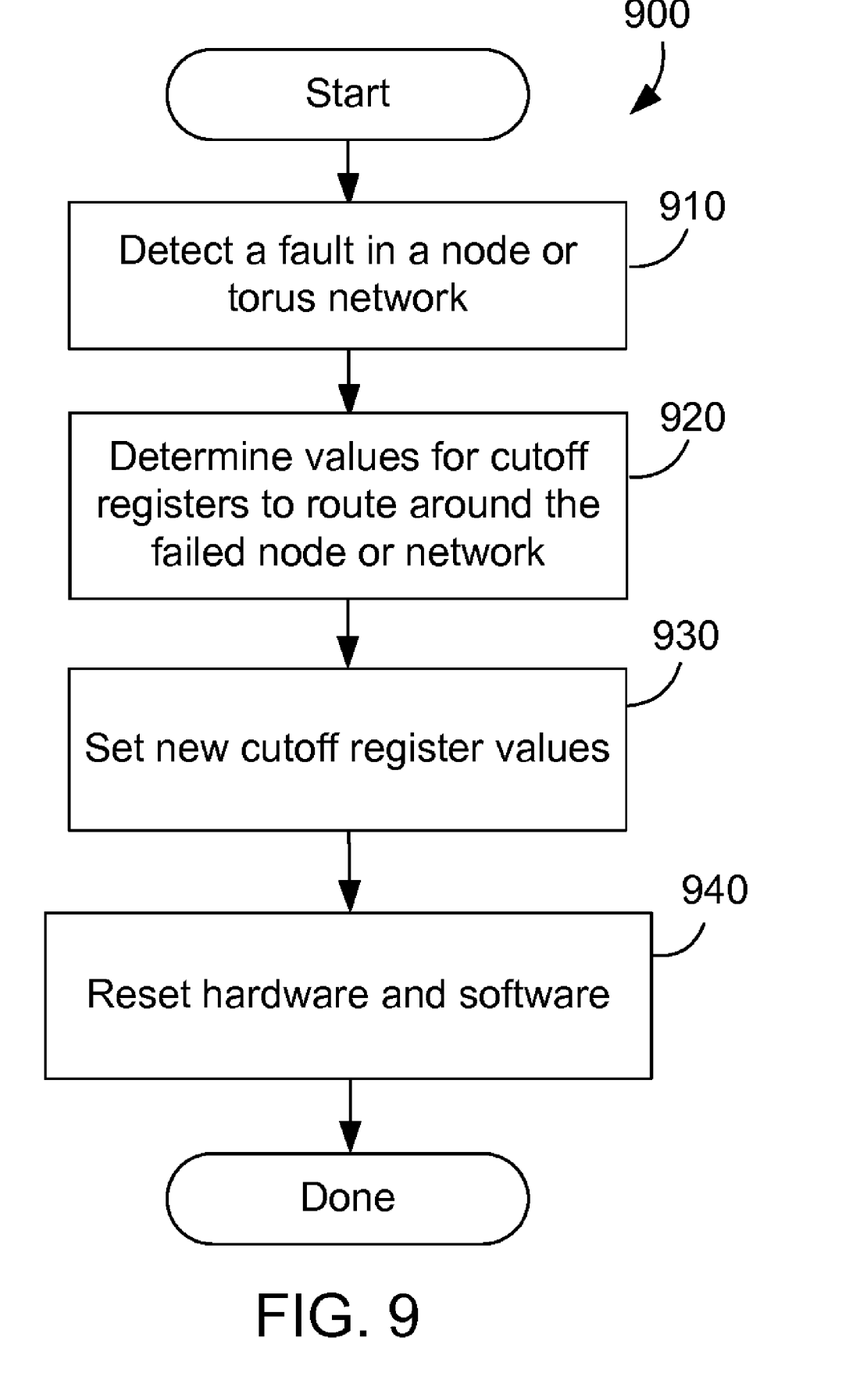
FIG. 9 is a method flow diagram for using cutoff registers to route network traffic.

FIG. 9 shows a method 900 for a mesh routing mechanism 142 to route around a failed node or network connection on a parallel computer system. First, detect a fault in a node and/or torus network connection (step 910). Next, determine values for the cutoff registers to route around the failed node or network connection (step 920). Then set the cutoff registers with the new values (step 930). Then reset the hardware and reload the application software on the partition (step 940). The method is then done.

The disclosure herein includes a method and apparatus for overcoming a torus network failure in a parallel computer system. The mesh routing mechanism takes advantage of cutoff registers in each node to route node to node data transfers around the faulty node or network connection to decrease the amount of down time for increased efficiency of the computer system.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

What is claimed is:

1. A parallel computer system comprising:
a plurality of interconnected compute nodes connected with a torus network where each node has a node value from 0 to n in the x dimension, where n is an integer variable;
a mesh routing mechanism that converts the torus network to a mesh network when a fault occurs in a link in the torus network;
an x− cutoff register and an x+ cutoff register for each compute node that store node values; and
wherein the mesh routing mechanism assigns the node values for the x− cutoff register and the x+ cutoff register in relation to a location of the fault in the x dimension of the network to direct the compute nodes to communicate to adjacent nodes without traversing the fault;
wherein the node values stored in the x+ and x− cutoff registers for each node are assigned as follows:
If (the node value of a current node being determined <=break_plus) then assign
x− cutoff =0, and the x+ cutoff=break_plus;
Else assign x− cutoff=break_minus, and x+ cutoff=a max node value in X dimension;
where break_plus is the node value for a node with a broken X+ link; and
where break_minus is the node value for a node with a broken X− link; and
wherein a data packet is sent over the torus network depending on the node values of a sending node and a destination node in conjunction with the x− cutoff register and x+ cutoff register to determine which direction in the X dimension to send the data packet as follows:
If (a sending node > a destination node) then
if (the destination node >=cutoff for x−direction) send in X− direction
else send in X+ direction
If (the sending node < the destination node) then
if (the destination node <=cutoff for x+ direction) send in X+ direction
else send in X− direction.

2. The parallel computer system of claim 1 wherein the mesh routing mechanism is in a service node of the computer system.

3. The parallel computer system of claim 1 wherein the compute nodes are interconnected with the torus network to connect each node with its six nearest neighbors in three dimensions.

4. The parallel computer system of claim 3 further comprising Y+, Y−, Z+ and Z− cutoff registers in Y and Z dimensions respectively.

5. The parallel computer system of claim 1 wherein the computer system is a massively parallel computer system.

6. A computer implemented method for fault recovery in a parallel computer system where the method comprises the steps of:
providing at least one processor;
providing a memory coupled to the at least one processor;
detecting a fault in a torus network that interconnects a plurality of compute nodes where each node has a node value from 0 to n in the x dimension, where n is an integer variable;
determining node values to store in an x− cutoff register and an x+ cutoff register in each of the plurality of compute nodes of the parallel computer system to avoid the fault;
setting the new node values in the x− and x+ cutoff registers;
resetting the hardware and software to route data over the torus network to avoid the fault using the new node values in the x− and x+ cutoff registers;
assigning the node values stored in the x+ and x− cutoff registers for each node as follows:
If (the node value of a current node being determined <=break_plus) then assign
x− cutoff=0, and the x+ cutoff=break_plus;
Else assign x− cutoff=break_minus, and x+ cutoff=a max node value in X dimension;
where break_plus is the node value for a node with a broken X+ link; and
where break_minus is the node value for a node with a broken X— link; and
sending a data packet over the torus network depending on the node values of a sending node and a destination node in conjunction with the x− cutoff register and x+ cutoff register to determine which direction in the X dimension to send the data packet as follows:
If (a sending node > a destination node) then
if (the destination node >=cutoff for x−direction) send in X− direction
else send in X+ direction;
If (the sending node < the destination node) then
if (the destination node <=cutoff for x+ direction) send in X+ direction
else send in X− direction.

7. The computer implemented method of claim 6 wherein step of determining values for the cutoff registers is performed by a mesh routing mechanism in a service node of the computer system.

8. The computer implemented method of claim 6 wherein the compute nodes are interconnected with the torus network to connect each node with its six nearest neighbors in three dimensions.

9. The computer implemented method of claim 8 further comprising Y+, Y−, Z+ and Z− cutoff registers in Y and Z dimensions respectively.

10. The computer implemented method of claim 6 wherein the computer system is a massively parallel computer system.

11. An article of manufacture comprising:
a torus network connecting a plurality of compute nodes in a parallel computer system nodes where each node has a node value from 0 to n in the x dimension, where n is an integer variable;
an x− cutoff register and an x+ cutoff register for each compute node that store node values;
a mesh routing mechanism that converts the torus network to a mesh network when a fault occurs to open the torus network by assigning the node values for the x− cutoff register and the x+ cutoff register in relation to a location of the fault in the x dimension of the network to direct the compute nodes to communicate to adjacent nodes without traversing the fault;
wherein the node values stored in the x+ and x− cutoff registers for each node are assigned as follows:
If (the node value of a current node being determined <=break_plus) then assign x− cutoff=0, and the x+ cutoff=break_plus;
Else assign x− cutoff=break_minus, and x+ cutoff=a max node value in X dimension;

where break_plus is the node value for a node with a broken X+ link; and where break_minus is the node value for a node with a broken X- link;

wherein a data packet is sent over the torus network depending on the node values of a sending node and a destination node in conjunction with the x- cutoff register and x+ cutoff register to determine which direction in the X dimension to send the data packet as follows:

If (a sending node > a destination node) then if (the destination node >=cutoff for x- direction) send in X- direction else send in X+ direction If (the sending node < the destination node) then if (the destination node <=cutoff for x+ direction) send in X+ direction else send in X- direction; and computer recordable media bearing the mesh routing mechanism.

12. The article of manufacture of claim 11 wherein the mesh routing mechanism is in a service node of the computer system.

13. The article of manufacture of claim 11 wherein the computer system is a massively parallel computer system.

14. The article of manufacture of claim 11 further comprising a y+ cutoff register, a y- cutoff register, a z+ cutoff register and a z- cutoff register in the Y and Z dimensions respectively for each compute node.

* * * * *